July 1, 1952  J. A. DANIELSON  2,601,968
AUTOMATIC AIR PRESSURE SAFETY VALVE
Filed Oct. 31, 1945
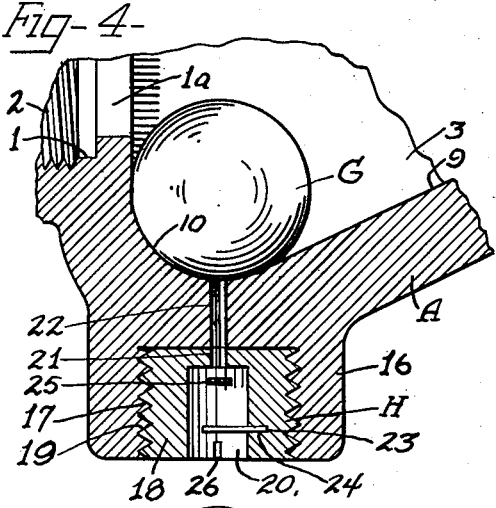
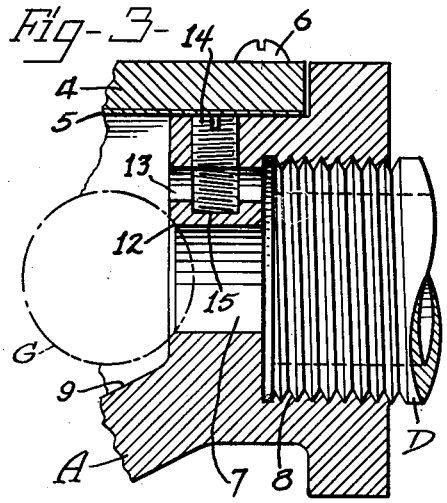
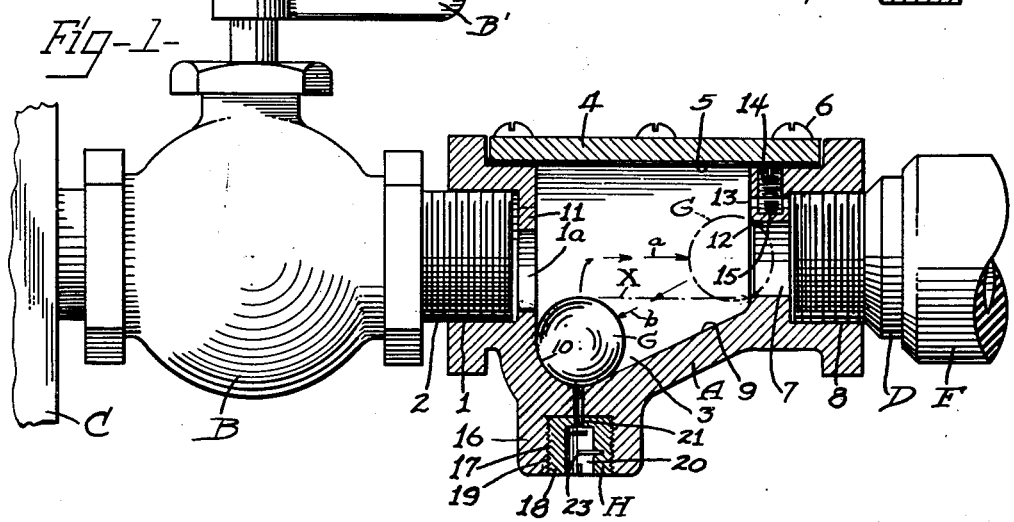
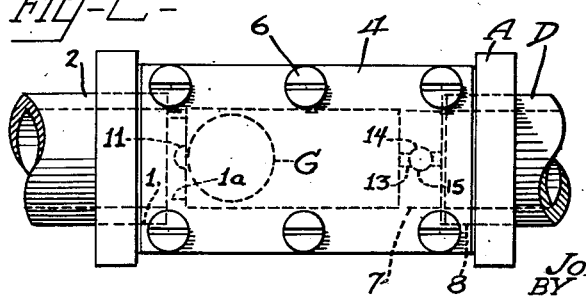
INVENTOR
JOHN A. DANIELSON
BY
Munn, Liddy & Glaccum
ATTORNEYS Patented July 1, 1952

2,601,968

UNITED STATES PATENT OFFICE 2,601,968

AUTOMATIC AIR PRESSURE SAFETY VALVE

John A. Danielson, Richmond, Calif.

Application October 31, 1945, Serial No. 625,845

3 Claims. (Cl. 251—120)

This application is a continuation-in-part of my application on an automatic air pressure safety valve, Serial No. 487,401, filed May 17, 1943, now abandoned. In said application I disclose an automatic air pressure safety valve for flexible conduits conveying a fluid under pressure which will prevent the conduit from whipping when it suddenly breaks. The device can also be used for automatically shutting off the flow of fluid in conduits where leaks permit more than a predetermined quantity of fluid to escape therefrom.

I further disclosed novel means for automatically opening the valve when the break in the conduit was fixed or when leakage of the conduit was reduced below the permissible minimum. This feature permits a pneumatic tool to be changed at the end of an air hose without the operator needing to walk from the end of the hose to the inlet manifold to turn off the air before making the change and then making a second trip to turn on the air after attaching the other tool.

In the present case I make the automatic valve opening means adjustable so as to vary the time when the valve will open after the conduit has been fixed. The adjustable means can also be regulated to cause the valve to open even though the conduit leaks to a certain extent. This permits the operator to determine for himself the condition of the flexible conduits he wishes to use with his pneumatic tools.

Still a further object of my invention is to provide a device of the type described which will automatically give a signal when the valve is closed due to a faulty or broken conduit, the signal being automatically stopped when the valve again opens.

Other objects and advantages will appear in the following specification, and the novel features of the device will be particularly pointed out in the appended claims.

My invention is illustrated in the accompanying drawings forming a part of this application, in which:

Figure 1 is a longitudinal section through the valve and shows it operatively applied to a main air inlet valve and to an air hose;

Figure 2 is a top plan view of the valve;

Figure 3 is an enlarged section illustrating the adjustable bleed passage; and

Figure 4 is an enlarged section illustrating the air actuated warning signal.

While I have shown only the preferred form of my invention, it should be understood that various changes or modifications may be made within the scope of the appended claims without departing from the spirit and scope of the invention.

In carrying out my invention I provide a casing A that has an entrance opening 1, threaded for receiving the threaded end 2 of a main valve B. The valve B is connected to an air manifold C and air under pressure is delivered to the manifold by any means, none being shown. It is obvious that steam or a liquid under pressure can be used with my device just as well as air.

The threaded opening 1 leads into a compartment 3 which has its open top closed by a cover 4. A gasket 5 is placed between the cover and the casing and the cover is secured in place by any suitable fastening means such as screws 6. The compartment 3 communicates with an outlet opening 7 that is enlarged and threaded at 8 for receiving the spud D that is connected to an air hose F.

The compartment 3 has its lower wall inclined as at 9 and this wall extends downwardly from the outlet opening 7 to a curved portion 10 that is designed to receive a ball valve G. The ball is prevented from passing through the reduced portion 1a of the opening 1 by a pin 11 that extends down into the opening a distance sufficient to prevent the ball from passing therethrough. The opening 7 is smaller in diameter than the diameter of the ball and this opening is provided with a valve seat 12 against which the ball seats in a manner hereinafter described.

A bleed passage 13 extends from the enlarged portion 8 of the opening 7 and has its inner end communicating with the compartment 3 at a point disposed above the top of the inner end of the opening 7. A set screw 14 is received in a threaded bore 15 that cuts across the opening 13 and the set screw may be adjusted for altering the effective size of the bleed passage 13.

Figure 3 shows the bleed passage 13 on a larger scale and illustrates how the set screw 14 can be rotated for cutting off any portion of the bleed passage desired. It is possible to close the bleed passage completely when the set screw is rotated for moving it into the bottom of the threaded bore 15. The set screw is normally enclosed by the cover 4 and this necessitates the operator removing the cover before the set screw can be adjusted. This arrangement prevents unwarranted tampering with the set screw because before an adjustment can be made the handle B' of the valve B must be turned for shutting off the air and then the screws 6 must be removed in order to free the cover 4 and permit access to the set screw.

The purpose of the adjustable bleed passage is to take care of different operating conditions. When the bleed passage is entirely unobstructed and the ball G is seated against the valve seat 12 by the air pressure in the compartment 3, a fairly large quantity of air will bleed from the compartment 3 into the hose F and cause the hose to fill up with air more quickly after the break has been fixed or when a pneumatic tool has been applied to the free end of the hose. If a longer time is desired for filling the hose with air, the bleed passage 13 can be partially closed. The adjustment is usually made to keep the bleed passage substantially entirely open when a long length of hose is used and the bleed passage is partially closed when a shorter length of hose is used. This will cause about the same time period to elapse between the attachment of a tool to the hose and the releasing of the ball valve from the valve seat whether the hose is long or short. In certain cases where the ball G is to act as a check valve, the set screw 14 can be rotated for completely closing the bleed passage 13.

Referring to Figure 1, it will be seen that the inclined bottom wall 9 communicates with the curved portion 10 that is designed to receive the ball G when the ball is at rest and the valve is in open position. The position of the curved portion 10 with respect to the reduced opening 1a is such as to cause the top of the ball valve to extend into the air stream, flowing through the valve, a slight distance. Before describing the operation of the ball in moving from the curved portion 10 to the valve seat 12, it is best to set forth the construction of the warning signal.

Figures 1 and 4 show the valve casing A provided with a depending boss 16 and this boss has a threaded opening 17 for receiving a signal carrying member indicated generally at H. The signal H comprises a body 18 that has a threaded outer surface 19 designed to be screwed into the threaded opening 17. The body 18 has a recess 20 therein and at the top of the recess a bore 21 of a small diameter communicates with a bore 22 that in turn extends to the bottom of the curved portion 10.

A reed 23 or other warning device, has one end placed in a slot 24 and the other end extends transversely across the recess 20 and is free to vibrate. If desired a baffle 25 may be placed in the recess 20 and adjacent to the bore 21 so as to break up the high speed of the air flow as it issues from the bore. The baffle may be altered in size to vary the air flow. The body of the signal H has a kerf 26 by means of which the body is screwed into place or removed from the valve casing A.

In the operation of the signal it will be seen that when the ball G is moved from the curved portion 10 to the valve seat 12, the opening 22 will be uncovered. Air under pressure will pass through both the opening 22 and the opening 21. In actual practice I have found that an opening having a diameter of about one sixty-fourth of an inch will be sufficient to permit air to pass therethrough and vibrate the reed. The air upon entering the much larger recess 20 will strike the baffle 25 and the course of air will be changed. Furthermore, the diameter of the recess 20 is about one-quarter of an inch and therefore the air flowing through the recess will be at a greatly reduced rate. The speed of air flow in the recess 20 has been designed to cause the reed 23 to vibrate as the air passes thereby and the vibrating reed will emit a signal which can be detected. When the ball G rests in the curved portion 10, the bore 22 will be closed and no air can escape therethrough. The signal therefore will not be sounded when the ball is at rest in the curved portion 10.

In the operation of the ball valve, I have found that when the ball G is at rest and the valve seat 12 uncovered, air will flow from the main valve into the hose. As the air passes through the compartment 3, a portion of the air stream will contact with the top of the ball. When one or two pneumatic tools are being used, the quantity of air consumed during their operation will be such as to slow down the flow of air through the compartment 3 to a point where the weight of the ball G will maintain it in the curved portion 10.

I have found that a cushion of compressed air indicated generally at X in Figure 1 will build up between the outlet 7 and the ball G. The top of the air cushion will coincide with the bottom of the air stream as it flows through the compartment 3 and the bottom of the air cushion will extend down to the inclined wall 9.

If now a break occurs in the hose F or if a pneumatic tool is disconnected from the hose preparatory to connecting another tool to the hose, the increase of air flowing through the compartment 3 is practically instantaneous and is great enough to cause the air stream to act upon the top of the ball G and start it rotating about its own axis. The air cushion X since it is under the maximum air pressure will have its outer surface act in much the same manner as a material surface over which the ball can roll. The result is that the initial rotative movement of the ball against the air cushion will cause the ball to rise in a vertical direction as indicated by the arrows a in Figure 1, and then as the ball moves upwardly into the air stream, it will be conveyed toward the valve seat 12 and finally come to rest against the valve seat so as to shut off any further flow of air through the opening 7.

I have found from actual practice that when the air flowing through the hose F is insufficient to cause the hose to whip, the ball G will remain quiet in the curved portion 10. As soon as the flow of air increases in speed to a point where the hose will whip, the ball G will be rolled up over the air cushion X and then will be forced against the valve seat 12 to close the opening 7. The ball is therefore a safety device primarily to prevent the hose from whipping and injuring some one when the hose breaks.

As soon as the break has been fixed or the tool has been connected to the free end of the hose, the air passing through the bleed passage 13 will build up an air pressure in the hose to a point where it will substantially equal the air pressure in the compartment 3. The weight of the ball will cause it to drop away from the valve seat 12 by gravity and roll along the inclined lower wall 9 back to the curved portion 10 as indicated by the arrows b. The path taken by the ball in moving from the curved portion 10 to the valve seat and then back to the depression will be in substantially a triangular course.

The valve will close automatically when the air flowing through is of sufficient volume to cause the hose to whip. The ball will remain quiet in the compartment 3 until the flow of air reaches a point where the hose will whip if it becomes disconnected. The average pneumatic tool requires approximately 8% of the air passing through a one-inch hose. The valve will remain open until in excess of 25% of the volume of air flows therethrough. The pneumatic tool using only 8% of the air volume will therefore receive full pressure of air just the same as if the valve were not used. In fact up to three average pneumatic tools can operate simultaneously on one air line efficiently with the valve. If more tools than three or four are used on one line, a large enough quantity of air will flow through so that the line will whip if it should break. The valve is therefore sensitive enough to close when sufficient air under pressure flows through the line to cause it to whip if the line should break.

The valve can be placed on either side of the main valve B and could be used without a main valve. When the valve is placed between the manifold and the main valve B, it will be impossible to tamper with the check valve. The bleed passage can be adjusted to reduce the flow of air to a point where leaky air lines and air tools can be detected. If the leakage equals the flow of air through the passage, then the air pressure cannot build up to a point sufficient to release the ball. With the adjustable bleed passage it is possible to vary the opening to obtain a slow or a fast build up of air pressure. It is possible to adjust the bleed passage to accommodate hose of different diameters.

The intensity of the sound given off by the vibratory reed can be regulated by moving the reed toward or away from the outlet end of the recess 20. The closer the reed is placed to the outlet end of the recess, the louder the tone given off by the reed.

I claim:

1. An automatic air-pressure safety valve comprising a casing having an air passage extending entirely therethrough with a valve seat disposed intermediate the ends of the passage and facing toward the upstream end of the passage, said casing having a depending compartment communicating with the valve seat on the upstream end of the seat, the compartment having a lower wall making an acute angle with the portion of the longitudinal axis of the passage disposed on the upstream side of the seat, a ball valve normally received within the compartment and having a minor portion projecting above the lower surface of the passage while the major portion lies below the passage, the weight of the ball and the inclination of the lower wall portion of the compartment causing the ball to remain in the compartment during the normal flow of air through the passage while an increased air flow will cause the ball to close the valve seat, the compartment having an air escape passage closed by the ball when the latter is at rest in the compartment, said escape passage being uncovered when the ball closes the valve seat, and a signal sounded by the air flowing through the escape passage.

2. In a two-way automatic air-pressure safety valve, a casing having an air passage extending entirely therethrough with a valve seat disposed intermediate the ends of the passage and facing toward the upstream end of the passage, said casing having a depending compartment communicating with the valve seat on the upstream end of the seat, a ball valve normally received within the compartment and having a minor portion projecting above the lower surface of the passage, the weight of the ball causing it to remain in the compartment during the normal flow of air through the passage, while an increased air flow will move the ball and cause it to close the valve seat and an air actuated signal carried by the casing, said casing having an air escape passage leading to the signal and closed by the ball when the latter is at rest in the compartment, the ball uncovering the escape passage when moved to close the valve seat and permitting air to actuate the signal.

3. In a two-way automatic air-pressure safety valve, a casing having an air passage extending entirely therethrough with a valve seat disposed intermediate the ends of the passage and facing toward the upstream end of the passage, said casing having a depending compartment communicating with the valve seat on the upstream end of the seat, a ball valve normally received within the compartment and having a minor portion projecting above the lower surface of the passage, the weight of the ball causing it to remain in the compartment during the normal flow of air through the passage, while an increased air flow will move the ball and cause it to close the valve seat, and an air actuated signal removably carried by the casing, said casing having an air escape passage leading to the signal and closed by the ball when the latter is in the compartment, the ball uncovering the escape passage when moved to close the valve seat and permitting air to actuate the signal, said signal having a large area passage communicating with the escape passage, a vibratory reed placed in the enlarged area, and a baffle placed between the reed and escape passage.

JOHN A. DANIELSON.

REFERENCES CITED

The following references are of record in the file of this patent:

UNITED STATES PATENTS

| Number | Name | Date |
|---|---|---|
| 622,529 | Paul | Apr. 4, 1899 |
| 749,810 | Truman | Jan. 19, 1904 |
| 871,717 | Lyter | Nov. 19, 1907 |
| 1,695,848 | Higgins | Dec. 18, 1928 |
| 1,761,394 | Jacobus | June 3, 1930 |
| 1,788,358 | Goerg | Jan. 6, 1931 |
| 2,036,589 | Loughridge | Apr. 7, 1936 |

FOREIGN PATENTS

| Number | Country | Date |
|---|---|---|
| 4,932 | Denmark | 1902 |
| 538,306 | France | 1922 |
| 551,386 | Great Britain | Feb. 19, 1943 |